(12) United States Patent
Schoen et al.

(10) Patent No.: US 9,635,739 B2
(45) Date of Patent: Apr. 25, 2017

(54) DYNAMIC EXTERIOR AIRCRAFT LIGHT UNIT AND METHOD OF OPERATING A DYNAMIC EXTERIOR AIRCRAFT LIGHT UNIT

(71) Applicant: Goodrich Lighting Systems Gmbh, Lippstadt (DE)

(72) Inventors: Christian Schoen, Mainz (DE); Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/158,911

(22) Filed: May 19, 2016

(65) Prior Publication Data

US 2016/0345408 A1    Nov. 24, 2016

(30) Foreign Application Priority Data

May 20, 2015   (EP) .................................... 15168387

(51) Int. Cl.
| | | |
|---|---|---|
| H05B 37/02 | (2006.01) | |
| H05B 33/08 | (2006.01) | |
| G01S 17/02 | (2006.01) | |
| G01S 17/42 | (2006.01) | |
| B64D 47/04 | (2006.01) | |
| B64D 47/06 | (2006.01) | |

(52) U.S. Cl.
CPC ......... *H05B 37/0227* (2013.01); *B64D 47/04* (2013.01); *B64D 47/06* (2013.01); *G01S 17/026* (2013.01); *G01S 17/42* (2013.01); *H05B 33/0854* (2013.01)

(58) Field of Classification Search
CPC .... H05B 37/02; H05B 37/0227; H05B 33/08; H05B 33/0854; B64D 47/04; B64D 47/06; G01S 17/02; G01S 17/42
See application file for complete search history.

(56) References Cited

U.S. PATENT DOCUMENTS

| | | |
|---|---|---|
| 5,422,716 A | 6/1995 | Dempsey |
| 6,963,292 B1 | 11/2005 | White |
| 7,755,515 B2 * | 7/2010 | Hagan .................... B64D 47/06 340/961 |
| 8,482,663 B2 | 7/2013 | Farchtchian et al. |

(Continued)

FOREIGN PATENT DOCUMENTS

WO    2014200589 A2    12/2014

OTHER PUBLICATIONS

Extended European Search Report of the European Patent Office for International Application No. EP15168387.7, Oct. 28, 2015, 4 pages.

*Primary Examiner* — Thai Pham
(74) *Attorney, Agent, or Firm* — Cantor Colburn LLP

(57) ABSTRACT

A dynamic exterior aircraft light unit includes a plurality of LEDs, with at least two subsets of the plurality of LEDs being separately, an optical system for transforming light output from the plurality of LEDs into at least two light emission distributions, a control unit for controlling the plurality of LEDs, and a photo detector arranged to detect light, emitted by the dynamic exterior aircraft light unit as part of the at least two light emission distributions and reflected by the aircraft environment, and configured to output a light detection signal.

15 Claims, 7 Drawing Sheets

(56) References Cited

U.S. PATENT DOCUMENTS

| | | | | |
|---|---|---|---|---|
| 8,605,261 | B2* | 12/2013 | Rindle | G01S 7/4817 356/3.01 |
| 2008/0137353 | A1* | 6/2008 | Larsen | B64D 47/04 362/470 |
| 2009/0164122 | A1 | 6/2009 | Morbey et al. | |
| 2013/0110323 | A1* | 5/2013 | Knight | G01S 13/93 701/3 |
| 2015/0156464 | A1* | 6/2015 | Lee | H04N 7/185 348/144 |

* cited by examiner

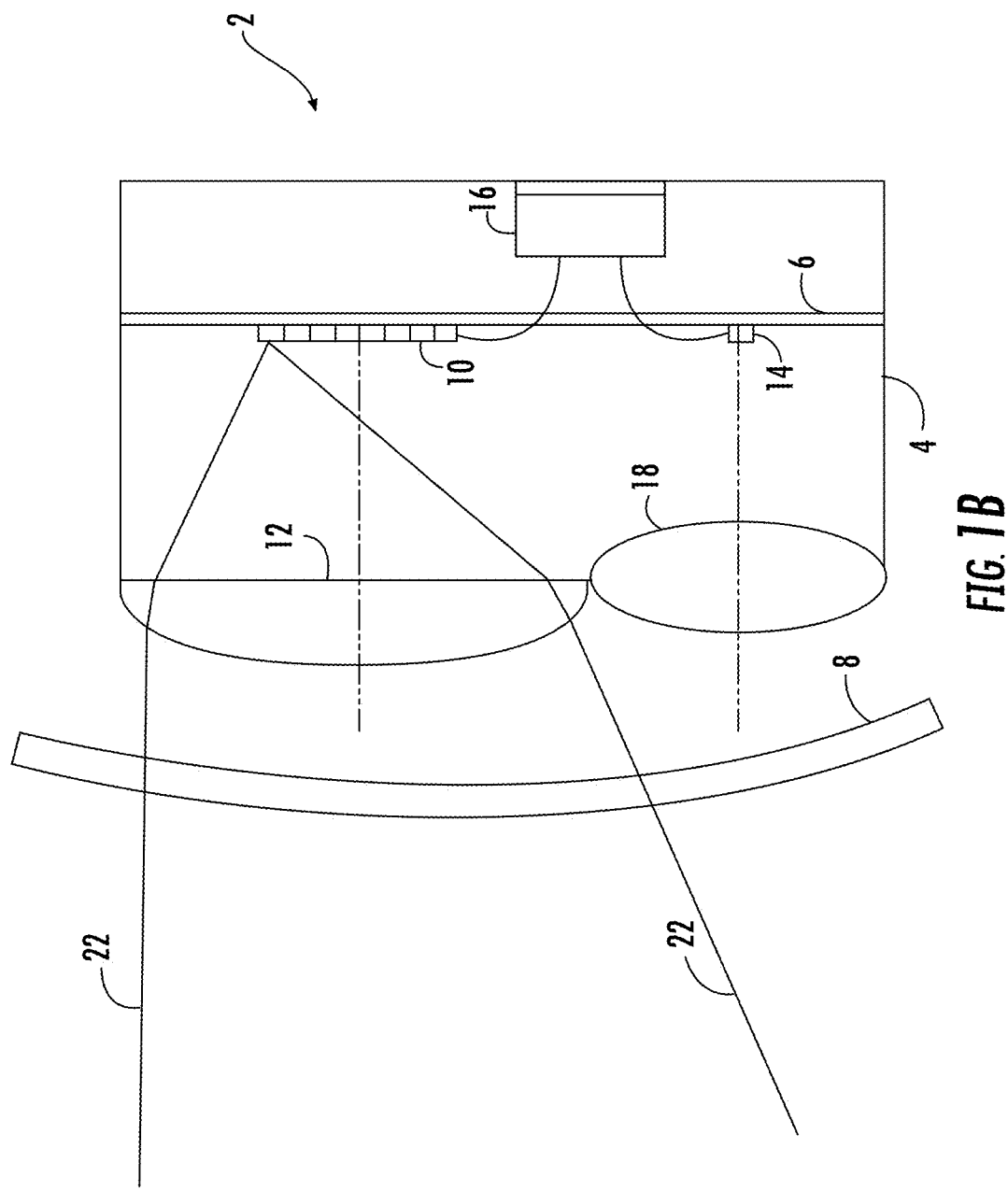

DYNAMIC EXTERIOR AIRCRAFT LIGHT UNIT AND METHOD OF OPERATING A DYNAMIC EXTERIOR AIRCRAFT LIGHT UNIT

FOREIGN PRIORITY

This application claims priority to European Patent Application No. 15 168 387.7 filed May 20, 2015, the entire contents of which is incorporated herein by reference.

TECHNICAL FIELD

The present invention is in the field of exterior aircraft lighting. In particular, the present invention is in the field of exterior aircraft light units that have multiple modes of operation.

BACKGROUND OF THE INVENTION

Almost all aircrafts are equipped with exterior lights. For example, large passenger air planes have a wide variety of exterior lights. Examples are navigation lights or position lights, beacon lights, anti-collision lights or strobe lights, wing lights, taxi lights, landing lights, runway turnoff lights, etc. Exemplary helicopters usually have landing lights, search lights, etc. With the given large number of different lights and an ever increasing adaptation of the lights to particular operating situations, the burden on the pilot and/or air crew for correctly and favourably operating the lights has become quite significant.

Accordingly, it would be beneficial to provide exterior aircraft light units that reduce the burden of operation to the pilot and/or air crew.

SUMMARY

Exemplary embodiments of the invention include a dynamic exterior aircraft light unit, capable of emitting light in accordance with at least two light emission distributions for illuminating different sectors of an aircraft environment, the dynamic aircraft light unit comprising a plurality of LEDs, with at least two subsets of the plurality of LEDs being separately controllable, with each of the at least two subsets being associated with a respective one of the at least two light emission distributions, an optical system for transforming light output from the plurality of LEDs into the at least two light emission distributions, a control unit for controlling the plurality of LEDs, and a photo detector arranged to detect light, emitted by the dynamic exterior aircraft light unit as part of the at least two light emission distributions and reflected by the aircraft environment, and configured to output a light detection signal, wherein the control unit is coupled to the photo detector for receiving the light detection signal, is configured to determine a distance to the aircraft environment reflecting the light, and is configured to switch between the at least two subsets of the plurality of LEDs as a response to the distance determined.

Exemplary embodiments of the invention allow for a reduction of the pilot and/or air crew workload by providing an exterior aircraft light unit that switches between different lighting modes without pilot and/or air crew interaction as a response to the distance to an object in the aircraft environment. For example, during the high-stress phase of a landing approach with an air plane, exemplary embodiments of the exterior aircraft light unit may provide landing light functionality, characterized by a narrow, high-intensity illumination beam, in order to illuminate the landing runway, before switching to a taxiing light mode, characterized by a wider, less intense illumination beam, in order to illuminate a broader sector of the aircraft environment and in order to make the aircraft better visible from a greater number of locations at an airport. The light unit may be configured to perform this switching at a predetermined height before touchdown, freeing the pilot from the task of switching the light units manually. Other exemplary embodiments of the dynamic exterior aircraft light unit may help a helicopter pilot in a high-stress phase of a search flight close to ground. It is for example possible that the dynamic exterior aircraft light unit emits a light emission distribution according to a search light mode, characterized by a very narrow search light beam, and that the dynamic exterior aircraft light unit switches to a landing light mode, characterized by a wider light emission distribution, at a predetermined distance to ground, in order to make the pilot aware of potential obstacles, when flying at such short distance to ground. In this case, the pilot is freed from the task of manually switching between the lighting modes and receives an additional warning about the distance to ground being small.

The exterior aircraft light unit according to exemplary embodiments of the invention is referred to as a dynamic exterior aircraft light unit, because it is capable of outputting a plurality of light emission distributions. Each of those light emission distributions illuminates a different sector of the aircraft environment. The term different sectors of the aircraft environment does not necessarily refer to mutually exclusive sectors of the aircraft environment. To the contrary, the different sectors, associated with different light emission distributions, may be overlapping. However, as they are not identical, the dynamic exterior aircraft light unit is capable of emitting light in accordance with at least two different light emission distributions. Each of the different light emission distributions is associated with a respective subset of the plurality of light sources. In other words, a particular subset of the plurality of light sources may lead to the provision of a particular light emission distribution, while another subset of the plurality of LEDs may lead to another light emission distribution.

The optical system of the dynamic exterior aircraft light unit transforms the light, as output from the plurality of LEDs, into the plurality of light emission distributions. In other words, for a given subset of the plurality of LEDs, the optical system transforms the light, as output from the given subset, into the associated light emission distribution. In yet other words, the optical system shapes the corresponding light emission distribution for a given subset of the plurality of LEDs. In this context, it is possible that one single optical system is provided that effects the light output from all of the plurality of LEDs. However, it is also possible that two or more optical subsystems are provided that are associated with mutually exclusive subsets of the plurality of LEDs. The optical system generally provides for a desired direction and for a desired opening angle of the dynamic exterior aircraft light unit in a given mode of operation.

The control unit controls the plurality of LEDs, thus effecting the emission of a desired one of the plurality of light emission distributions at any given point in time. In particular, the control unit can switch on a desired subset of the plurality of LEDs, which is associated with a desired light emission distribution, in order to achieve this desired light emission distribution and the desired lighting mode. It is possible that each one of the plurality of LEDs is individually controllable by the control unit or that groups of LEDs are jointly controllable.

The photo detector detects light that was emitted by the exterior aircraft light unit as part of the illumination of the aircraft environment. In this way, the photodetector is not part of a separate distance measurement system, such as laser distance measurement systems used in the prior art. To the contrary, the photodetector detects visible light that was part of the illumination. The reflected light is a by-product of the illumination of the aircraft environment, such that no additional light sources are needed for the distance measurement in accordance with the exemplary embodiments of the invention. The photodetector outputs a light detection signal. The light detection signal may be a direct representation of the amount of light detected, either as an analog signal or in a digitized version. However, it is also possible that a pre-processing step is carried out before the outputting of the light detection signal. For example, it is possible that the light detection signal contains information about characteristic events that the photodetector detects, without actually transmitting the course of detected light over time.

The control unit is configured to determine the distance to the aircraft environment reflecting the light on the basis of said light detection signal. Depending on the amount of pre-processing being done within the photodetector, the control unit may analyse the light detection signal to various extents. It may also relate the light detection signal to the information about the light emitted by the dynamic exterior aircraft light unit during the detection operation. On the basis of the determination of the distance, the control unit is configured to switch between different light emission distributions by switching between the different subsets of the plurality of LEDs. In other words, the control unit selects a particular subset of LEDs for emitting a particular light intensity distribution on the basis of the determined distance.

According to a further embodiment, the dynamic exterior aircraft light unit is an air plane landing light. As discussed in an exemplary manner above, the dynamic exterior aircraft light unit according to the exemplary embodiments of the invention may be used in a particularly beneficial manner as an air plane landing light. During a runway approach, the pilot and/or air crew may be busy with the handling of the air plane, such that the automatic switching of the dynamic exterior aircraft light unit between different lighting modes, i.e. between different light emission distributions, is particularly beneficial.

According to a further embodiment, the dynamic exterior aircraft light unit is configured to emit light having a plurality of emission light pulses, with the photodetector detecting response light pulses reflected by the aircraft environment. Light pulses are an effective means of receiving information about the aircraft environment that is reflecting light. As the response light pulses can be related to the emission light pulses, various deviations between the response light pulses and the emission light pulses, such as lag, pulse duration, pulse shape, pulse intensity, etc., can be analysed and can be used for analysing the aircraft environment. The emission light pulses may have a frequency that is not visible to the human eye, such as a frequency of at least 50 Hz, in particular of between 50 Hz and 200 Hz. In this way, the dynamic exterior aircraft light unit may be operated in a pulsed manner for one or more or all of the different light emission distributions, without this pulsed operation being visible to the human eye. It is also possible that the dynamic exterior aircraft light unit is generally operated in a continuous manner, with a series of emission light pulses being sent out in regular intervals. The regular intervals may be between 5 sec and 15 sec, i.e. there may be one series of emission light pulses every 5-15 seconds, e.g. every 5 seconds, every 10 seconds, or every 15 seconds.

According to a further embodiment, the control unit is configured to determine the distance to the aircraft environment reflecting the light on the basis of a lag between the emission light pulses and the response light pulses. In other words, by determining a lag between a given emission light pulse and an associated response light pulse, the response light pulse being comprised of light sent out during the associated emission light pulse, the distance to the aircraft environment reflecting the light, i.e. the distance to the illuminated object, can be reliably determined.

According to a further embodiment, the control unit is configured to determine an air plane glide angle on the basis of an intensity and a duration of the response light pulses. Due to the opening angle of the dynamic exterior aircraft light unit, which results in an extended area of illumination in the aircraft environment, and due to multiple points of the aircraft environment reflecting light towards the photodetector, the response pulses have different intensities and durations for different angles between the direction of illumination and the extended aircraft environment. As the dynamic exterior aircraft light unit commonly has a fixed position with respect to the aircraft structure, these differences in intensity and duration of the response light pulses can be used to determine an approach angle towards the object that is reflecting the light in the aircraft environment. It is possible that the control unit uses this approach angle as an estimate of the glide angle of the air plane during the approach. It is also possible that the control unit determines, on the basis of this approach angle, if an approach to an airport is currently under way, because the control unit may be configured to have the information that the glide angle towards a runway is always between 2° and 5°. Based on this knowledge, it is possible that the control unit interprets a particular approach angle to be not a glide angle, because the approach angle is not a feasible glide angle.

According to a further embodiment, the control unit is configured to determine surface characteristics of the aircraft environment reflecting the light on a basis of a shape of the response light pulses. For example, extended objects made of concrete or asphalt or a combination of asphalt and concrete may reflect light in such a way that the response light pulses have an initial peak and a monotonically decreasing shape, starting from the peak. This is an example how the shape of the response light pulses can be used to infer surface characteristics of the objects of the aircraft environment that reflects the light.

According to a further embodiment, the control unit is configured to determine if the aircraft environment reflecting the light is a runway on the basis of at least one of intensity, duration and shape of the response light pulses. In a particular embodiment, the control unit is configured to determine that the aircraft environment reflecting the light is a runway if the intensity and duration of the response light pulses indicate a glide angle of between 2° and 5° and/or if the shape of the response light pulses indicates one of asphalt, concrete and a combination of asphalt and concrete. In other words, the control unit may be configured to use one or both of the information of the surface characteristics of the object reflecting the light, as deduced from the shape of the light pulses, and the information about the approach angle, as deduced from the intensity and duration of the response light pulses, to determine that an approach to a runway is going on. The control unit may be configured in such a way that such a determination is a prerequisite for a later switching of the light emission distributions. In other words, the control unit may be configured to only switch to ground lighting modes or close-to-ground lighting modes, such as taxiing light mode, if a runway was detected previously.

According to a further embodiment, the control unit is configured to determine an aircraft approach speed on the basis of a variation of a lag between the emission light pulses and the response light pulses. Such determination of the air plane approach speed may be used as a check if the air plane is really in the course of a runway approach manoeuvre.

According to a further embodiment, the control unit is configured to switch from a first subset of the plurality of LEDs, associated with a landing light mode light intensity distribution, to a second subset of the plurality of LEDs, associated with a taxiing light mode light intensity distribution, on the basis of at least one of the distance to the aircraft environment reflecting the light, a glide angle, surface characteristics of the aircraft environment reflecting the light, a determination of the aircraft environment being a runway, and an aircraft approach speed. The one or more of these parameters taken into account for switching from the first subset of the plurality of LEDs to the second subset of the plurality of LEDs are determined from the response light pulses in this embodiment.

According to a further embodiment, the dynamic exterior aircraft light unit is a helicopter search and landing light, configured to switch from a first subset of the plurality of LEDs, associated with a search light mode light intensity distribution, to a second subset of the plurality of LEDs, associated with a landing light mode light intensity distribution, as a response to the distance being below a predetermined threshold value. In other words, when the control unit determines the distance to the illuminated object to be below the predetermined threshold value, it switches to the landing light mode light intensity distribution without pilot/ air crew interaction. In this way, the pilot is freed from the task of handling the light mode switching. As the search light mode often employs a very narrow, intense light beam, this mode of illumination commonly leads to a reduced awareness to the remainder of the environment by the pilot, whose eyes adapt to the intense beam. In this way, the search light mode can carry an inherent risk of the pilot disregarding the remainder of the helicopter environment. By switching to the landing light mode, when close to ground, the helicopter search and landing light is able to raise the pilot's awareness for potential obstacles that are outside the search light beam. The predetermined threshold value may for example be between 20 m and 40 m, in particular about 30 m.

It is pointed out that the additional features and modifications, described above with respect to the air plane landing light, also apply to the helicopter search and landing light. In particular, this helicopter light may also be configured to emit light having a plurality of emission light pulses, with the photo detector detecting response light pulses reflected by the aircraft environment.

According to a further embodiment, the exterior aircraft light unit further comprises a photo detector lens, associated with the photo detector, the photo detector lens directing light from an expected reflection sector towards the photo detector, the expected reflection sector having an opening angle of between 20° and 40° in a horizontal direction and between 10° and 20° in a vertical direction and the expected reflection sector being directed downwards at a direction angle of between 5° and 10°. In this way, the photo detector is aimed towards the regular field of sight of the pilot. This field of sight may correspond to the direction of illumination, aimed at by the exterior aircraft light unit, such that a large portion of the light reflected towards the aircraft can be picked up by the photo detector. This helps in achieving an accurate light detection and/or reduces the sensitivity requirements for the photo detector.

Exemplary embodiments of the invention further include a method of operating a dynamic exterior aircraft light unit, having a plurality of LEDs, an optical system, and a photo detector, the method comprising the steps of switching on a first subset of the plurality of LEDs, thereby emitting light with a first light intensity distribution via the optical system, detecting light, emitted by the first subset of the plurality of LEDs and reflected by an aircraft environment, by the photo detector, determining a distance to the aircraft environment reflecting the light on the basis of said step of detecting light by the photo detector, and switching on a second subset of the plurality of LEDs, thereby emitting light with a second light intensity distribution via the optical system, as a response to the distance determined. With said method of operating a dynamic exterior aircraft unit, the effects described above with respect to the dynamic exterior aircraft unit may be achieved in an analogous manner. Also, the additional features and modifications described above with respect to the dynamic exterior aircraft unit apply to the method of controlling the same in an analogous manner. Analogous method steps, in particular such method steps analogous to the configuration of the control unit described above, are disclosed herewith.

According to a further embodiment of the method of operating a dynamic exterior aircraft light unit, the dynamic exterior aircraft light unit is an air plane landing light, said first light intensity distribution is a landing light mode light intensity distribution, said second light intensity distribution is a taxiing light mode light intensity distribution.

According to a further embodiment, the method comprises the step of determining that the aircraft environment reflecting the light is a runway, carried out before said step of switching on the second subset of the plurality of LEDs.

BRIEF DESCRIPTION OF DRAWINGS

Further exemplary embodiments are described with respect to the accompanying FIGS., wherein:

FIG. 1a-FIG. 1b shows an exterior aircraft light unit in accordance with an exemplary embodiment of the invention in a schematic view;

DETAILED DESCRIPTION OF THE INVENTION

Figure 1A:
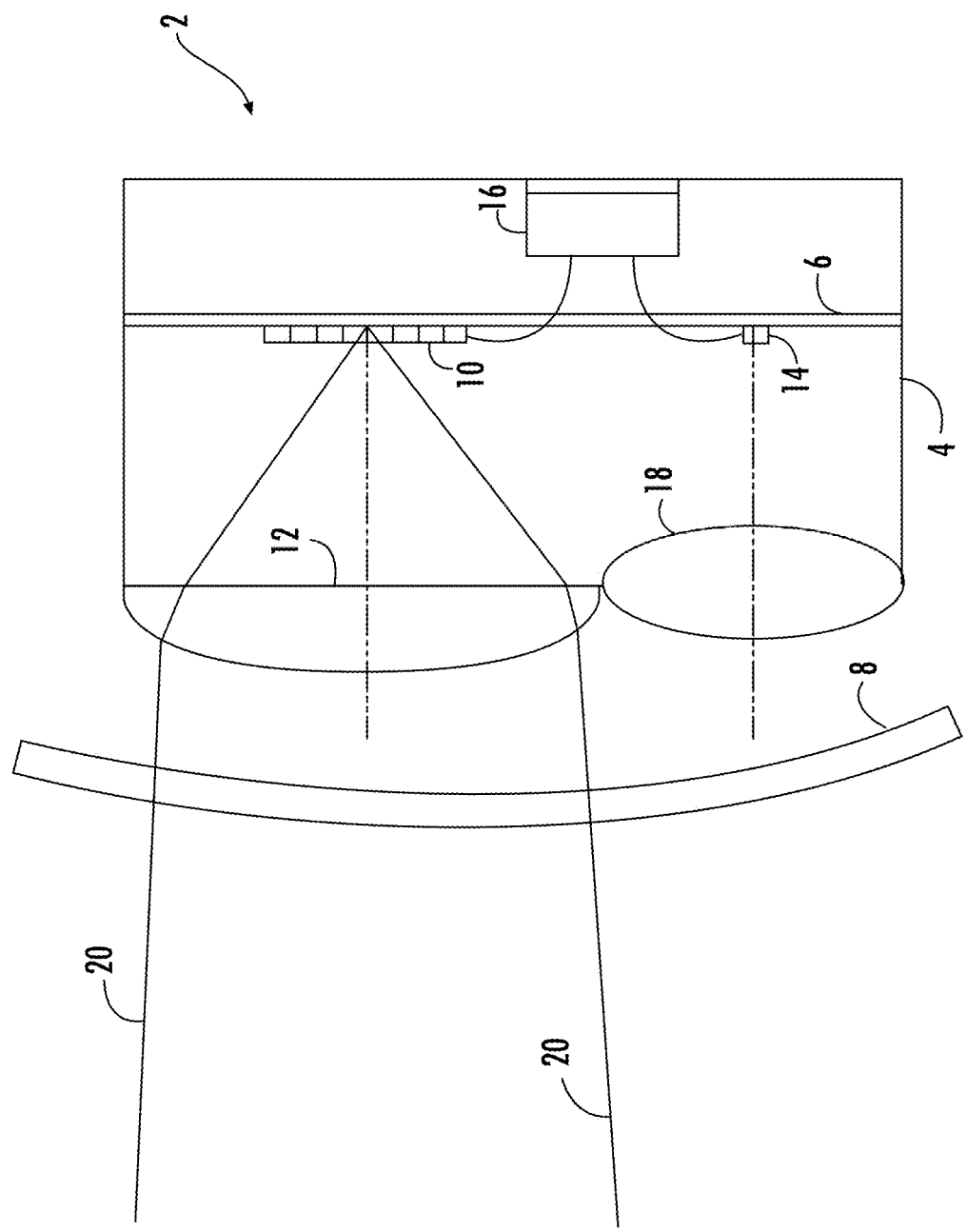

FIG. 1a shows an exemplary embodiment of an air plane landing light 2 in accordance with the invention. The air plane landing light 2 is a particular embodiment of a dynamic exterior aircraft light unit in accordance with exemplary embodiments of the invention. Accordingly, it is also referred to as an exterior aircraft light unit 2.

The exterior aircraft light unit 2 is shown in a cross-sectional, schematic view in the exemplary embodiment of FIG. 1a. The exterior aircraft light unit 2 comprises a housing 4 and a mounting plate 6, to which most of the other elements of the exterior aircraft light unit 2 are mounted. The mounting plate 6 is disposed within the interior of the housing 4. The exterior aircraft light unit 2 further comprises a lens cover 8, which forms the outermost portion of the exterior aircraft light unit 2 and through which the exterior aircraft light unit 2 emits light.

The exterior aircraft light unit 2 comprises a plurality of LEDs 10. In particular, the plurality of LEDs 10 are an array of LEDs. Further in particular, the array of LEDs is a two-dimensional array having a regular arrangement of LEDs 10, for example a grid-like arrangement of LEDs. In the schematic cross-sectional view of FIG. 1a, a portion of the two-dimensional array of LEDs 10, namely a section of a linear arrangement of eight LEDs 10 is shown as a merely illustrative example.

The exterior aircraft light unit 2 further comprises a lens 12, which is associated with the plurality of LEDs 10. The lens 12 is an exemplary optical system for shaping the light emission distribution, as emitted by the exterior aircraft light unit 2 through the lens cover 8, from the light emitted by the plurality of LEDs 10. The lens 12 is a rotationally symmetric lens, with the center axis thereof corresponding to the center of the array of LEDs 10. In the exemplary embodiment of FIG. 1a, the lens 12 is a collimating lens focusing the light emitted by the plurality of LEDs 10. It is illustrated via two light rays 20 that the lens 12 carries out a fairly good collimation of the light emitted by the LEDs close to the center of the array of LEDs 10. In this way, when operating LEDs close to the center of the array of LEDs 10, a narrow output beam can be achieved. Such a narrow output beam is one example of a possible light emission distribution of the exterior aircraft light unit 2. It illuminates a narrow sector of the aircraft environment.

The exterior aircraft light unit 2 further comprises a photodetector 14, mounted to the mounting plate 6. The photodetector 14 is associated with a photodetector lens 18. In the exemplary embodiment of FIG. 1a, the photodetector lens 18 is a rotationally symmetric lens and is arranged with respect to the photodetector 14 in such a way, that the axis through the center of the photodetector lens 18 runs through the photodetector 14. This combination of the photodetector 14 and the photodetector lens 18 is offset with respect to the plurality of LEDs 10 and the lens 12. There is no direct light path from any of the plurality of LEDs 10 to the photodetector 14, whose surface of photo detection is directed towards the photodetector lens 18.

The exterior aircraft light unit 2 further comprises a control unit 16, which is connected to the plurality of LEDs 10 and to the photodetector 14. The control unit 16 controls the plurality of LEDs 10. As will be explained below, the control unit 16 takes into account a light detection signal, generated by the photodetector 14 and output to the control unit 16, for controlling the plurality of LEDs 10.

FIG. 1b shows the exterior aircraft light unit 2 of FIG. 1a in a different mode of operation. While exemplary light rays 20 are shown in FIG. 1a for the case of LEDs close to the center of the plurality of LEDs 10 being switched on, FIG. 1b shows a situation where an LED that is maximally offset from the center of the plurality of LEDs 10 is turned on. For this case, two exemplary light rays, denoted with reference numeral 22, are shown. It can be seen that the collimation by the lens 12 is not as effective for LEDs that are offset from the center of the array of LEDs 10. In this way, the light emitted by the exterior aircraft light unit 2 has a wider opening angle, as compared to the operating mode shown in FIG. 1a. It is apparent from the comparison of FIG. 1a and FIG. 1b that various different light emission distributions can be achieved with the array of LEDs 10. Depending on which LEDs are operated, wider or more narrow light emission distributions can be achieved. Also, light emission distributions angled towards the top or angled towards the bottom in the drawing plane of FIGS. 1a and 1b can be achieved. Moreover, with the light intensity of the LEDs 10 adding up, light emission distributions with various intensities can also be achieved. For example, it is possible to achieve a landing light mode light intensity distribution that has a narrow light beam angled towards the runway. However, it is also possible with the same exterior aircraft light unit 2 to provide a taxiing light mode light intensity distribution that is less intense and that has a wider opening angle for illuminating a large portion of the airport in front of the pilot. It is pointed out that the desired light intensity may be achieved via the dimming of the LEDs 10 or via operating an appropriate number of LEDs 10, which is a particularly good option in the case of the array having a large number of LEDs.

Figure 2A:
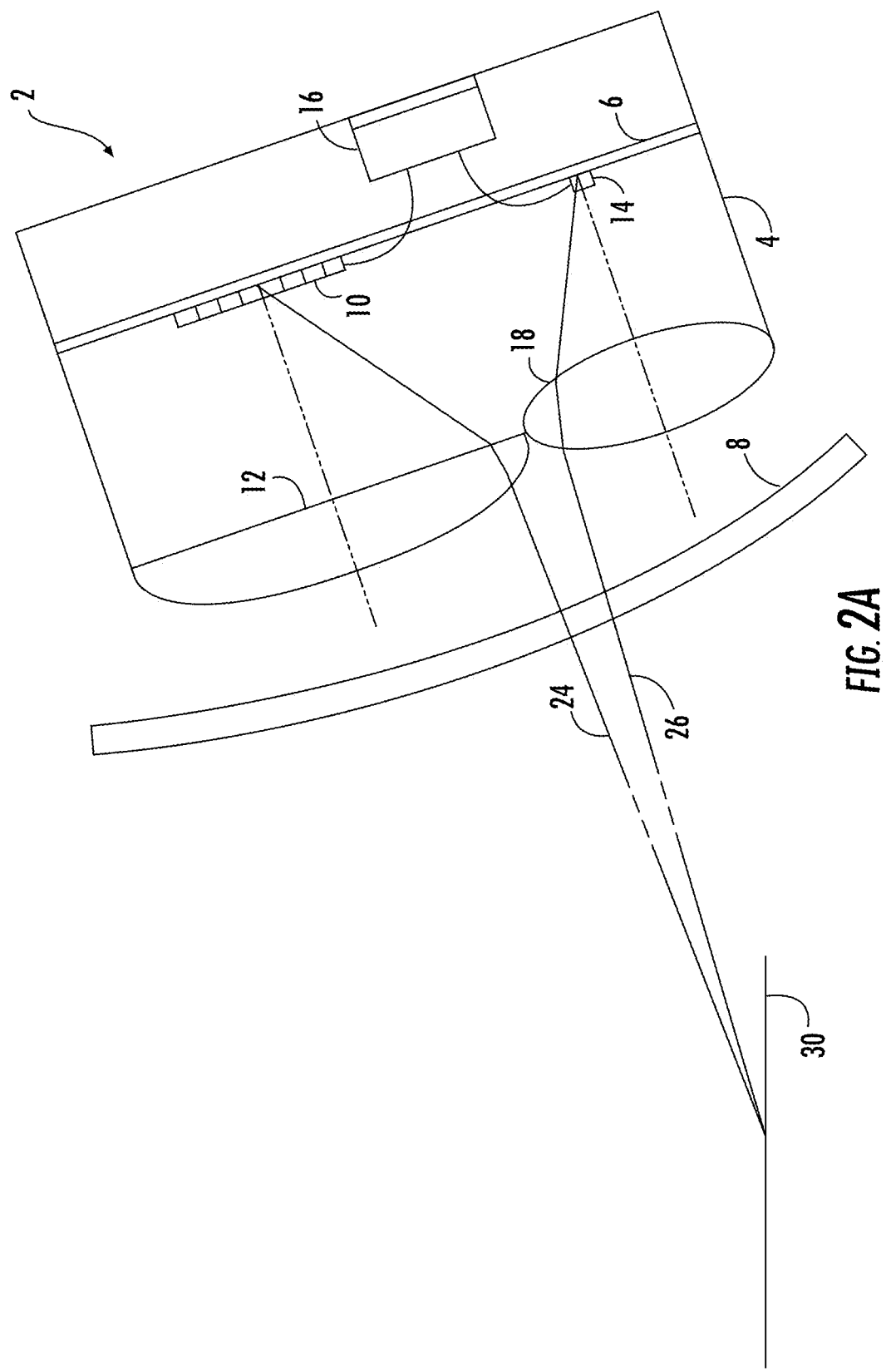
FIG. 2a-FIG. 2b shows the exterior aircraft light unit of FIG. 1 during a runway approach.

FIG. 2a shows the exterior aircraft light unit 2 of FIGS. 1a and 1b in the course of a reflection detection operation. For this purpose, the light emission towards and the reflection from a runway 30, as commonly encountered in airports, is shown. It is pointed out that FIG. 2a is not to scale in any way. The exterior aircraft light unit 2 is shown in the same size as in FIGS. 1a and 1b. Although much larger in reality, the runway 30 is depicted as a small object. Also, the distance between the exterior aircraft light unit 2 and the runway 30, which is much larger than any of those two elements for the most part of an approach, is comparably small in the depiction of FIG. 2a. In order to make it clear that FIG. 2a is schematic only and that a large change of scale is present between the exterior aircraft light unit 2 and the runway 30, the illustrative light rays 24 and 26, which will be described in detail below, are shown with dashed lines for a portion thereof. This indicates that the distance between the exterior aircraft light unit 2 and the runway 30 is not to scale in any way.

In FIG. 2a, the exterior aircraft light unit 2, which may be a landing light attached to the air plane front running gear extending downwards from the aircraft fuselage during the approach, is shown in an angled manner. This angle illustrates the angled nature of the whole air plane, and thus of the exterior aircraft light unit, during the glide approach towards the runway 30. Again, the downwards angle of the exterior aircraft light unit 2 is exaggerated in FIG. 2a for illustrative purposes.

Reference numeral 24 indicates an exemplary light ray that stems from one of the center LEDs of the array of LEDs 10, that is emitted by the exterior aircraft light unit 2, and that reaches the runway 30 for illumination thereof. It is assumed that the exterior aircraft light unit 2 is operated in a landing light mode, with the center LEDs of the array of LEDs being switched on and with the exterior aircraft light unit 2 emitting a fairly focused, narrow beam towards the runway 30. In the exemplary embodiment of FIG. 2a, the runway 30 is of concrete or of asphalt or of a combination of concrete and asphalt. As such, the runway 30 has a rough surface (in optical terms), and therefore reflects the arriving light in a diffuse manner. Due to this diffuse reflection, part of the light of the light ray 24 forms light ray 26, which reaches the photodetector 14 through the lens cover 8 and the photodetector lens 18. In other words, the photodetector 18 is able to detect light that is emitted by the LEDs 10 and reflected by the runway 30.

It is apparent that each of the LEDs 10 sends out many light rays, that these light rays reach the runway 30 at different points, and that different points of the runway 30 reflect/scatter light into various directions, with some of this light reaching the photodetector 14. Due to the different light paths, different running times of the light rays are present. As a consequence, when all or a selected subset of the LEDs 10 emit a light pulse of a finite, short length, the different light paths towards the runway 30 and back towards the photodetector 14 lead to different run times of the light rays, leading to a time-variant detection of light at the photodetector 14. In other words, for each such emission light pulse, the photodetector detects a response light pulse, with the response light pulse having characteristics that are different from the emission light pulse. This will now be described with respect to FIG. 3.

Figure 3A:
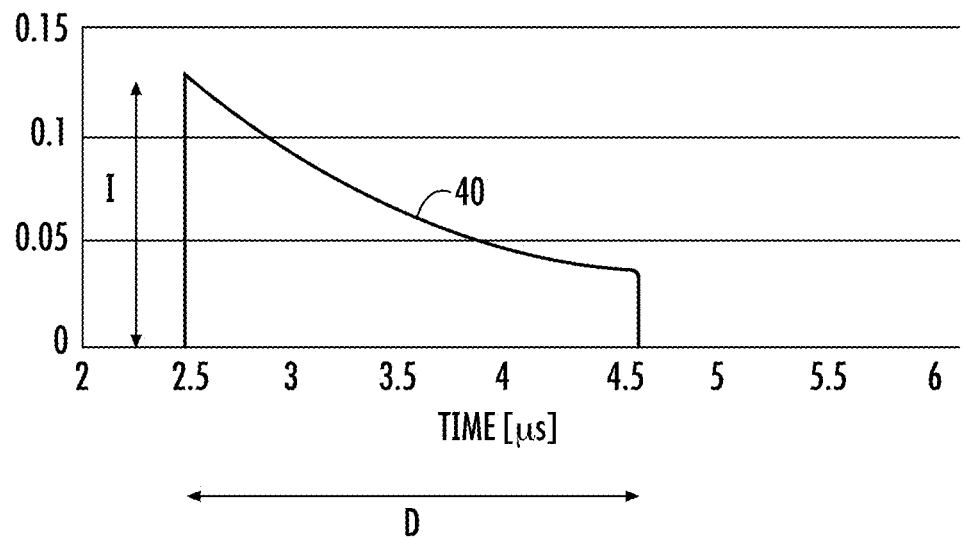
FIG. 3a-FIG. 3b shows exemplary response light pulses, as detected by the photo detector of the exterior aircraft light unit of FIG. 1.
Figure 3B:
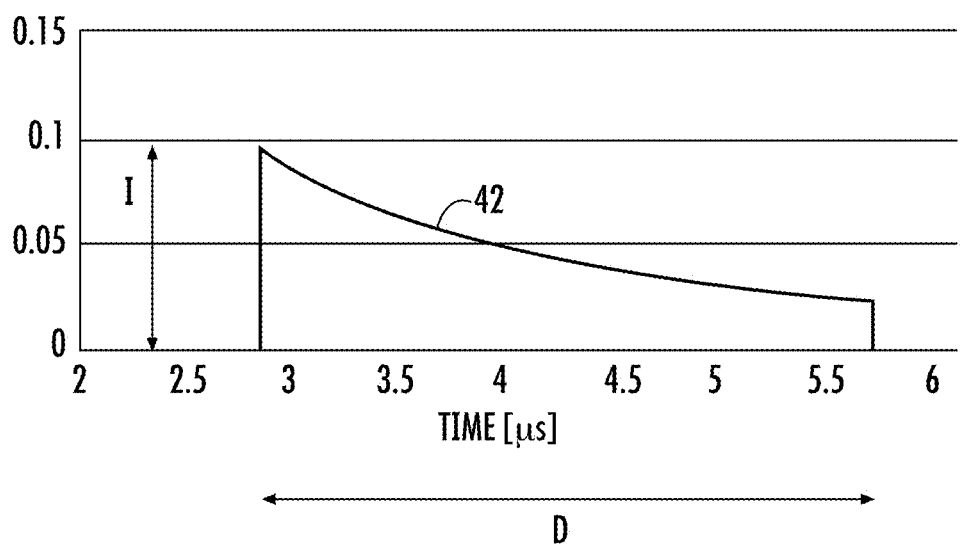

FIGS. 3a and 3b show two exemplary response light pulses 40, 42, as detected by the photodetector 14, for two different approach scenarios. These response light pulses 40, 42 are detected for the case of the emission of emission light pulses of short duration and constant intensity over said short duration. For example, typical light emission pulses may be less than 5 ms in duration. Each such emission light pulse results in the detection of a response light pulse at the photodetector 14. The response light pulses can be characterized by the beginning of the light pulse with respect to the beginning of the emission light pulse, i.e. by the lag of the response light pulse as compared to the emission light pulse. This lag is indicated on the x-axis of FIGS. 3a and 3b in µs.

The response light pulses may further be characterized by an initial intensity, referenced by letter I in FIGS. 3a and 3b, by the duration of the response light pulses, indicated by the letter D in FIGS. 3a and 3b, and by the shape of the response light pulses. All of these parameters of the response light pulses contain information about the flight situation and/or the characteristics of the illuminated aircraft environment reflecting the light, i.e. about the surface characteristics of the runway 30 in the present embodiment.

The lag is a measure of the distance to the runway 30. In particular, the lag is the time needed by the light taking the shortest path from the LEDs 10 to the runway 30 and back to the photodetector 14. This means that dividing the lag by 2 and multiplying the lag by the speed of light is a very accurate measure of the distance between the exterior aircraft light unit 2 and the runway 30.

The shape of the response light pulses, which is similar in FIGS. 3a and 3b according to some basic characteristics, such as the peak being at the beginning and the monotonic decrease thereafter, is an indication of the surface characteristics of the object reflecting the light. The shown response light pulses 40, 42 are very characteristic for surfaces like concrete or asphalt reflecting the light. Accordingly, the photodetector 14 or the control unit 16, depending on the level of pre-processing before passing on the signal to the control unit 16, can determine that the object reflecting the light is made of concrete/asphalt. In order to make this determination, the control unit may be configured to analyse the abruptness of the intensity peak at the beginning of the response light pulses and may be configured to analyse the slope and/or function of the decrease after this initial peak.

The intensity of the initial peak and the duration of the initial peak are indicators for the approach angle of the air plane. In FIG. 3a, the response light pulse 40 has an initial intensity peak of somewhat more than 0.1 on a relative scale, the details of which are not relevant to the present invention, and a duration of 2 µs. This intensity level and duration are an indication of a glide path of 3.5°, i.e. of an approach angle of about 3.5°. In FIG. 3b, the peak intensity level of the response light pulse 42 is somewhat less than 0.1 on the same scale and the duration of the response light pulse is about 3 µs. These values are an indication of a glide path of about 4.0°. In order to determine the glide path angle from the duration and the intensity of the initial peak, the control unit may have look up tables or formulas or other kinds of algorithms for reaching these conclusions.

Figure 4:
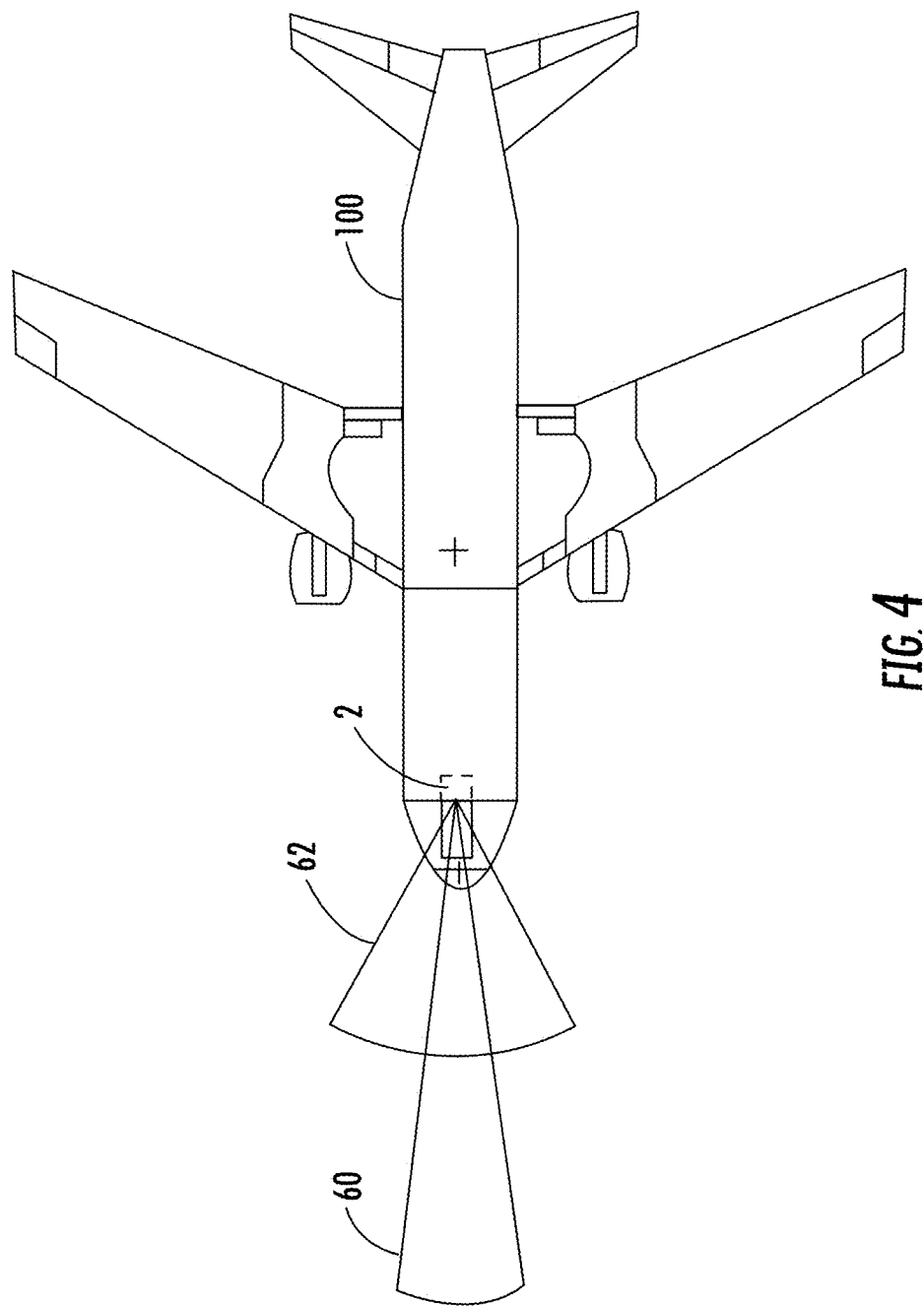
FIG. 4 shows an exemplary air plane, equipped with an exterior aircraft light unit in accordance with an exemplary embodiment of the invention.

The possibility of inferring this kind of information allows for the control unit 16 to operate the exterior aircraft light unit 2 in accordance therewith. As an exemplary embodiment, an operation of the exterior aircraft light unit during an air plane approach to a runway is described. For illustrative purposes, an exemplary air plane 100, equipped with an exterior aircraft light unit 2, mounted to the front running gear of the aircraft 100, is depicted in a top view in FIG. 4. Upon initiation of the approach phase of the flight, the control unit 16 selects a predetermined subset of the plurality of LEDs for emitting light in a landing light mode. In particular, the control unit 16 selects LEDs that are close to the center of the array of LEDs 10, in order to provide a narrow landing light beam. An exemplary, schematic output light intensity distribution for such a narrow landing light beam is depicted in FIG. 4 and indicated with reference numeral 60. While the control unit 16 operates these LEDs in a generally continuous manner, it disrupts the continuous light emission in regular intervals, e.g. every 10 seconds, in order to emit a series of emission light pulses. This series of emission light pulses may consist of e.g. 10 emission light pulses. These emission light pulses lead to response light pulses, detected at the photodetector 14, as described above with respect to FIGS. 2 and 3. From the shape of these response light pulses, the control unit 16 can infer that the object reflecting the light is of asphalt or concrete. This determination is the first check for the control unit 16 in order to make sure that a runway approach is actually under way. The control unit 16 further analyses the response light pulses for their duration and relative intensity. As discussed above, these parameters indicate a glide path angle. As the control unit 16 expects a glide path angle of between 2° and 5°, the control unit 16 checks if the glide path angle is between 2° and 5° and uses this determination as a second check that a runway approach is actually under way.

Once these two checks are completed, the control unit 16 analyses the lag between the emission light pulses and the response light pulses. This determination is possible, because the control unit 16 can relate the timing of the emission light pulses to the timing of the response light pulses. From this determination of the lag, the control unit 16 determines the distance to the runway. The control unit further switches the exterior aircraft light unit 2 to a taxiing light mode of operation, when the determined distance is below a predetermined threshold value, e.g. below a value of 75 m. For this purpose, the control unit 16 switches off some of the LEDs that were switched on in the landing light mode and switches on additional LEDs that are more removed from the center in the array of LEDs 10. In this way, a light emission distribution with a wider opening angle and a lower peak intensity is provided, such that the exterior aircraft light unit is in a taxiing light mode having a taxiing light emission distribution, as expected by the pilot and the airport personal. An exemplary, schematic output light intensity distribution for such a wider taxiing light mode beam is depicted in FIG. 4 and indicated with reference numeral 62.

Figure 2B:
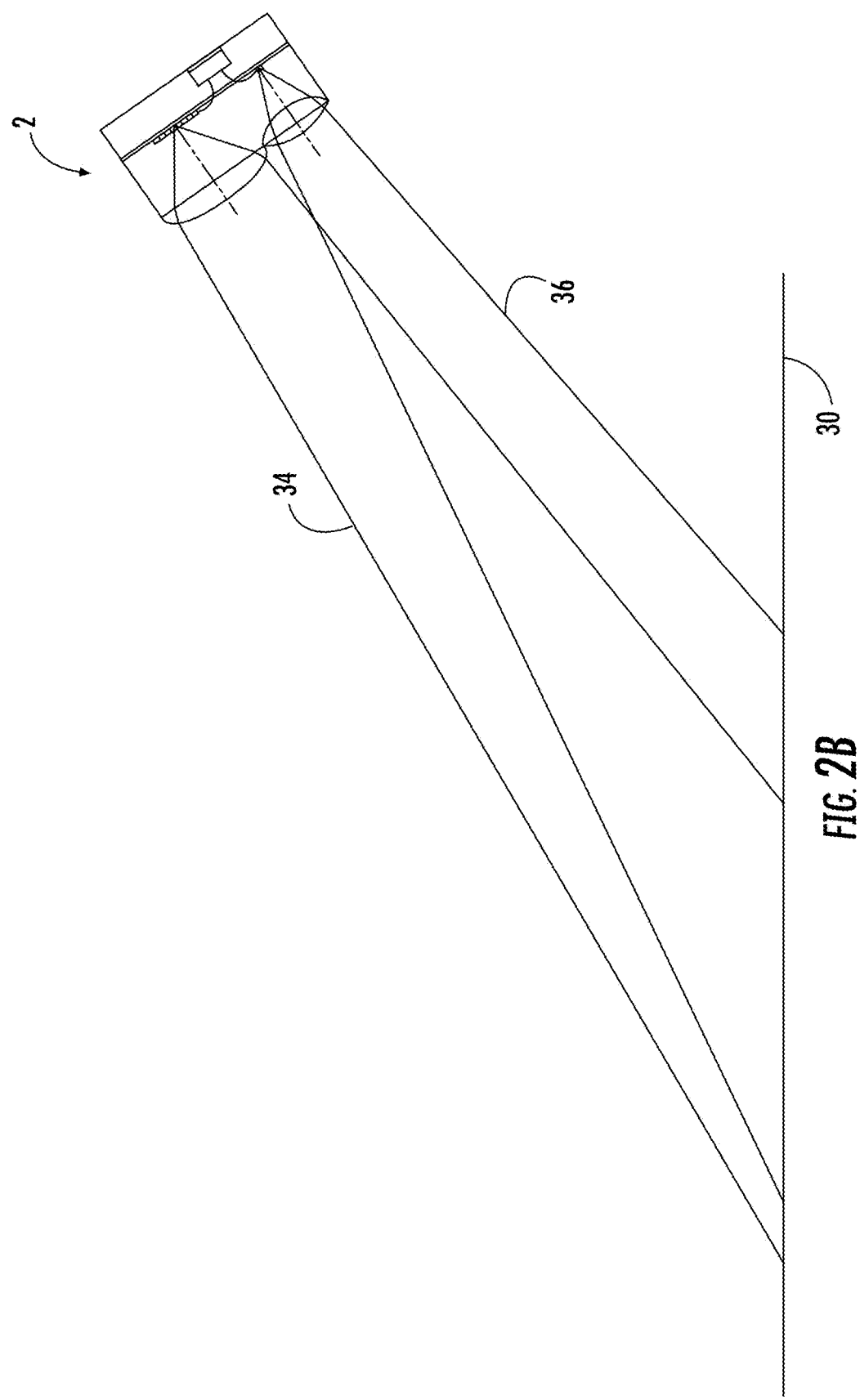

In FIG. 2b, the exterior aircraft light unit 2 is shown with respect to the aircraft runway 30, similar to FIG. 2a. The exterior aircraft light unit 2 is shown as emitting a narrow landing light beam 34, as described above with respect to the approach phase of the flight. Further, a detection sector 36 is depicted, which indicates a sector from where light directed towards the exterior aircraft light unit 2 is redirected towards the photo detector 14 by the photo detector lens 18. The landing light beam 34 and the detection sector 36 have a large overlap, such that much of the light that is reflected by the runway 30 towards the exterior aircraft light unit 2 is actually detected by the photo detector 14. The photo detector is arranged to detect light emitted by the exterior aircraft light unit 2 and reflected by the runway 30. The photo detector lens 18 helps in catching a large portion of that light for the detection operation.

Figure 5:
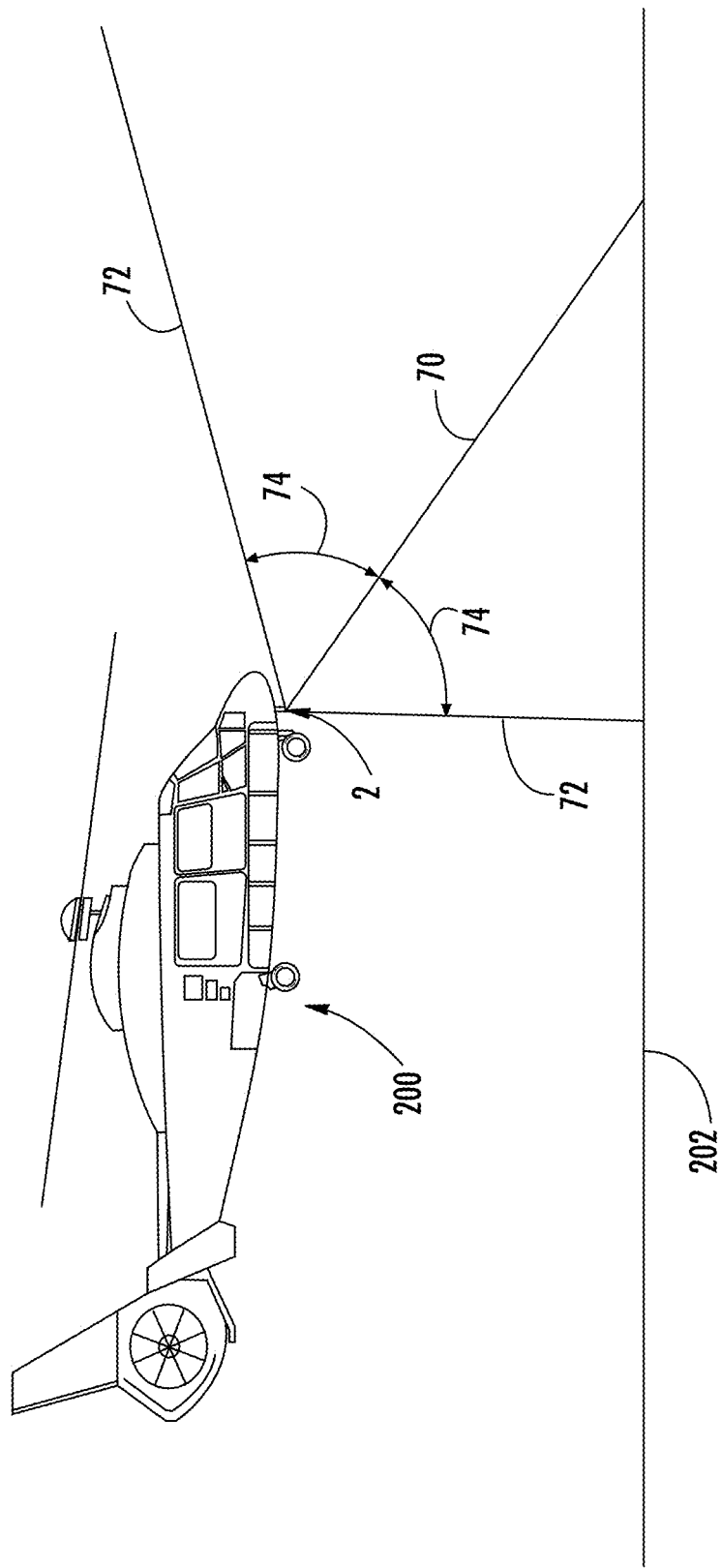
FIG. 5 shows an exemplary helicopter, equipped with an exterior aircraft light unit in accordance with an exemplary embodiment of the invention.

FIG. 5 shows an exemplary helicopter 200 equipped with an exterior aircraft light unit 2 un accordance with exemplary embodiments of the invention. The exterior aircraft light unit 2 is a helicopter search and landing light, which is mounted to a front bottom portion of the helicopter 200. The helicopter 200 flies above ground 202.

In a search light mode of operation, the exterior aircraft light unit 2 emits a very narrow search light beam, also referred to as spot light, along direction 70. This mode of operation may be used for thoroughly inspecting the ground in the direction 70 with the help of a narrowly focused, high intensity illumination beam. In a landing light mode of operation, the exterior aircraft light unit 2 emits a wide landing light beam, also referred to as a flood light, between directions 72. In the landing light mode of operation, the exterior aircraft light unit 2 emits a wide cone of light around the direction 70. This cone has an opening angle of about 90°, which is indicated by the two 45° angles 74. In this way, the pilot may be aware of and inspect a larger portion of the environment during landing. As described above, the exterior aircraft light unit 2 is configured to switch from the search light mode to the landing light mode as a response to the distance to ground, in particular the distance to ground in the direction 70, being below a predetermined threshold value, such as 30 m.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A dynamic exterior aircraft light unit, capable of emitting light in accordance with at least two light emission distributions for illuminating different sectors of an aircraft environment, the dynamic aircraft light unit comprising:
a plurality of LEDs, with at least two subsets of the plurality of LEDs being separately controllable, with each of the at least two subsets being associated with a respective one of the at least two light emission distributions,
an optical system for transforming light output from the plurality of LEDs into the at least two light emission distributions,
a control unit for controlling the plurality of LEDs, and
a photo detector arranged to detect light, emitted by the dynamic exterior aircraft light unit as part of the at least two light emission distributions and reflected by the aircraft environment, and configured to output a light detection signal,
wherein the control unit is coupled to the photo detector for receiving the light detection signal, is configured to determine a distance to the aircraft environment reflecting the light, and is configured to switch between the at least two subsets of the plurality of LEDs as a response to the distance determined.

2. The dynamic exterior aircraft light unit according to claim 1, wherein the dynamic exterior aircraft light unit is an air plane landing light.

3. The dynamic exterior aircraft light unit according to claim 2, configured to emit light having a plurality of emission light pulses, with the photo detector detecting response light pulses reflected by the aircraft environment.

4. The dynamic exterior aircraft light unit according to claim 3, wherein the control unit is configured to determine the distance to the aircraft environment reflecting the light on the basis of a lag between the emission light pulses and the response light pulses.

5. The dynamic exterior aircraft light unit according to claim 3, wherein the control unit is configured to determine an air plane glide angle on the basis of an intensity (I) and a duration (D) of the response light pulses.

6. The dynamic exterior aircraft light unit according to claim 3, wherein the control unit is configured to determine surface characteristics of the aircraft environment reflecting the light on the basis of a shape of the response light pulses.

7. The dynamic exterior aircraft light unit according claim 3, wherein the control unit is configured to determine if the aircraft environment reflecting the light is a runway on the basis of at least one of intensity (I), duration (D) and shape of the response light pulses.

8. The dynamic exterior aircraft light unit according to claim 7, wherein the control unit is configured to determine that the aircraft environment reflecting the light is a runway if the intensity (I) and duration (D) of the response light pulses indicate a glide angle of between 2° and 5° and/or if the shape of the response light pulses indicates one of asphalt, concrete and a combination of asphalt and concrete.

9. The dynamic exterior aircraft light unit according to claim 3, wherein the control unit is configured to determine an air plane approach speed on the basis of a variation of a lag between the emission light pulses and the response light pulses.

10. The dynamic exterior aircraft light unit according to claim 3, wherein the control unit is configured to switch from a first subset of the plurality of LEDs, associated with a landing light mode light intensity distribution, to a second subset of the plurality of LEDs, associated with a taxiing light mode light intensity distribution, on the basis of at least one of the distance to the aircraft environment reflecting the light, a glide angle, surface characteristics of the aircraft environment reflecting the light, a determination of the aircraft environment being a runway, and an aircraft approach speed, determined from the response light pulses.

11. The dynamic exterior aircraft light unit according to claim 1, wherein the dynamic exterior aircraft light unit is a helicopter search and landing light, configured to switch from a first subset of the plurality of LEDs, associated with a search light mode light intensity distribution, to a second subset of the plurality of LEDs, associated with a landing light mode light intensity distribution, as a response to the distance being below a predetermined threshold value.

12. The dynamic exterior aircraft light unit according to claim 1, further comprising a photo detector lens, associated with the photo detector, the photo detector lens directing light from an expected reflection sector towards the photo detector, the expected reflection sector having an opening angle of between 20° and 40° in a horizontal direction and between 10° and 20° in a vertical direction and the expected reflection sector being directed downwards at a direction angle of between 5° and 10°.

13. A method of operating a dynamic exterior aircraft light unit, having a plurality of LEDs, an optical system, and a photo detector, the method comprising the steps of:

switching on a first subset of the plurality of LEDs, thereby emitting light with a first light intensity distribution via the optical system, detecting light, emitted by the first subset of the plurality of LEDs and reflected by an aircraft environment, by the photo detector, determining a distance to the aircraft environment reflecting the light on the basis of said step of detecting light by the photo detector, and switching on a second subset of the plurality of LEDs, thereby emitting light with a second light intensity distribution via the optical system, as a response to the distance determined.

14. The method of operating a dynamic exterior aircraft light unit according to claim 13, wherein the dynamic exterior aircraft light unit is an air plane landing light, wherein said first light intensity distribution is a landing light mode light intensity distribution, wherein said second light intensity distribution is a taxiing light mode light intensity distribution.

15. The method of operating a dynamic exterior aircraft light unit according to claim 14, wherein the method comprises the step of:

determining that the aircraft environment reflecting the light is a runway, carried out before said step of switching on the second subset of the plurality of LEDs.

* * * * *